(12) United States Patent
Prevost et al.

(10) Patent No.: US 11,524,323 B2
(45) Date of Patent: Dec. 13, 2022

(54) DECONTAMINATION DEVICE AND METHOD FOR MILITARY MATERIEL

(71) Applicant: UTILIS, Ennery (FR)

(72) Inventors: Philippe Prevost, Metz (FR); Thibaut Kieffer, Mondelange (FR)

(73) Assignee: UTILIS, Ennery (FR)

( * ) Notice: Subject to any disclaimer, the term of this patent is extended or adjusted under 35 U.S.C. 154(b) by 159 days.

(21) Appl. No.: 16/478,398

(22) PCT Filed: Feb. 26, 2018

(86) PCT No.: PCT/EP2018/054660
§ 371 (c)(1),
(2) Date: Jul. 16, 2019

(87) PCT Pub. No.: WO2018/154105
PCT Pub. Date: Aug. 30, 2018

(65) Prior Publication Data
US 2019/0366399 A1  Dec. 5, 2019

(30) Foreign Application Priority Data

Feb. 24, 2017 (FR) .................................. 17 51 494

(51) Int. Cl.
*B08B 15/02* (2006.01)
*B64F 5/30* (2017.01)
(Continued)

(52) U.S. Cl.
CPC ................ *B08B 15/02* (2013.01); *B08B 5/02* (2013.01); *B64F 1/005* (2013.01); *B64F 5/30* (2017.01); *E04H 1/1277* (2013.01); *E04H 6/44* (2013.01)

(58) Field of Classification Search
CPC ... B08B 15/02; B08B 5/02; B64F 5/30; B64F 1/005; E04H 1/1277; E04H 6/44; Y02T 50/80; Y02P 70/50
See application file for complete search history.

(56) References Cited

U.S. PATENT DOCUMENTS

2005/0074359 A1    4/2005  Krieger et al.
2010/0326470 A1*  12/2010  Seippel .................. F28G 15/00
                                                              702/182
(Continued)

FOREIGN PATENT DOCUMENTS

EP    0 494 053 A1    7/1992
EP    1 522 454 A2    4/2005
(Continued)

OTHER PUBLICATIONS

International Search Report, issued in PCT/EP2018/054660, dated May 24, 2018.

*Primary Examiner* — Erin F Bergner
(74) *Attorney, Agent, or Firm* — Birch, Stewart, Kolasch & Birch, LLP

(57) ABSTRACT

A device for the decontamination of materiel, notably an aircraft such as a military helicopter, using a nuclear, biological and/or chemical decontaminant. The device includes a protective cover that can be adapted to the shape of the materiel, able to form a fluid tight decontamination tunnel around the materiel; at least one decontamination module able to eliminate the contamination from the materiel arranged inside the tunnel formed by the protective cover; an air-blowing module able to be arranged at the entrance to the tunnel formed by the protective cover in order to dispatch air into the said tunnel; and a filtration module able to be positioned at the exit from the tunnel formed by the protective cover in order to destroy contaminated air vapours (Continued)

Figure 1:
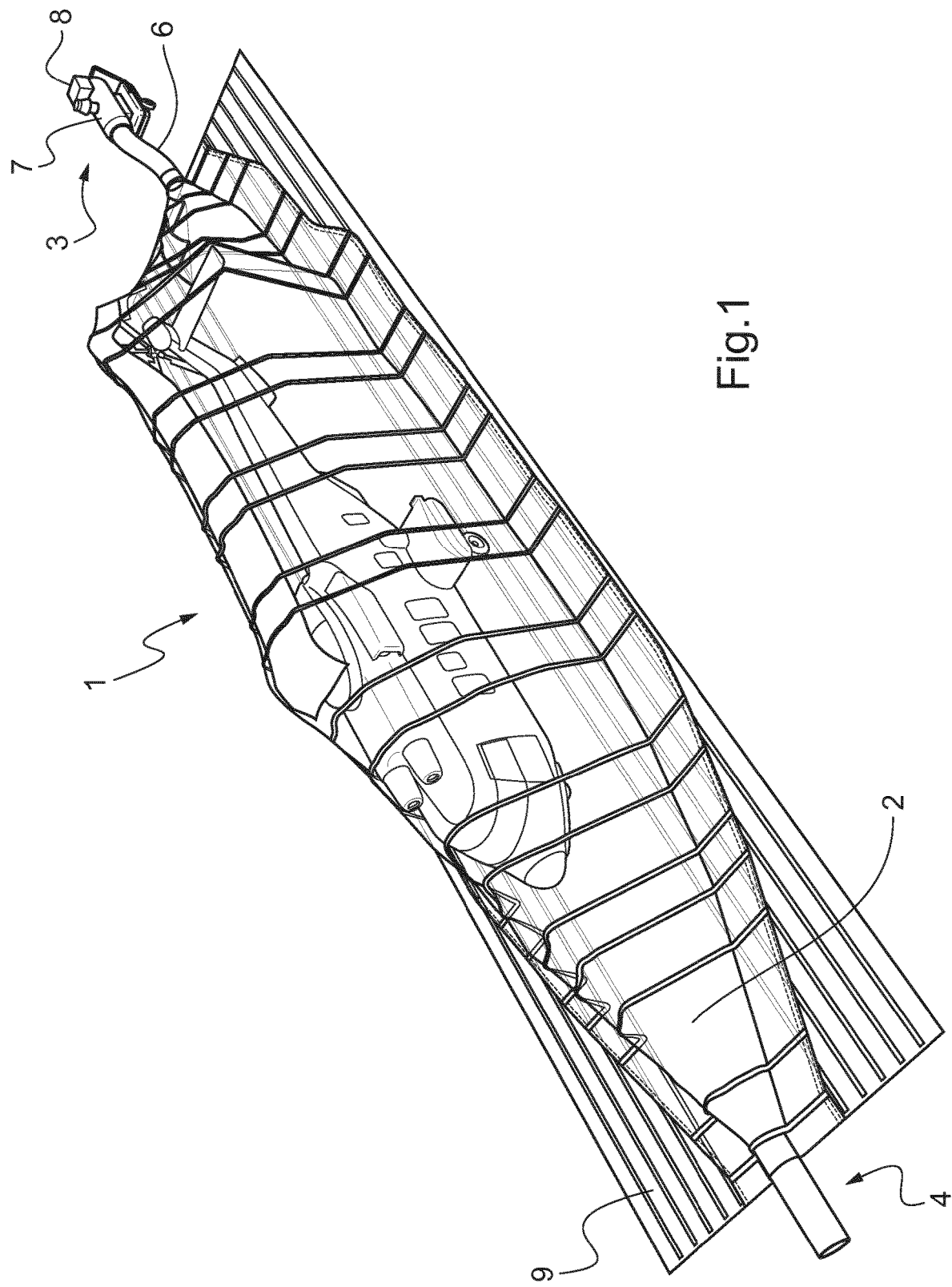

and/or to recover the decontaminant at the exit from the said tunnel.

18 Claims, 2 Drawing Sheets

(51) Int. Cl.
  *B08B 5/02* (2006.01)
  *B64F 1/00* (2006.01)
  *E04H 1/12* (2006.01)
  *E04H 6/44* (2006.01)

(56) References Cited

U.S. PATENT DOCUMENTS

| | | | |
|---|---|---|---|
| 2013/0160800 A1* | 6/2013 | Steinmann | B08B 5/02 |
| | | | 15/345 |
| 2013/0263403 A1* | 10/2013 | Agorichas | B08B 9/023 |
| | | | 15/300.1 |
| 2017/0036779 A1 | 2/2017 | Seckel | |

FOREIGN PATENT DOCUMENTS

| | | |
|---|---|---|
| FR | 2 630 385 A1 | 10/1989 |
| FR | 2 759 973 A1 | 8/1998 |
| FR | 2 840 272 A1 | 12/2003 |
| FR | 3 030 020 A1 | 6/2016 |
| WO | WO 2007/102798 A1 | 9/2007 |
| WO | WO 2008/125776 A1 | 10/2008 |

\* cited by examiner

DECONTAMINATION DEVICE AND METHOD FOR MILITARY MATERIEL

SCOPE OF THE INVENTION

The invention relates to a decontamination device and method for nuclear, biological and/or chemical decontaminant, namely for the purpose of decontaminating military materiel. The invention is particularly well adapted to the decontamination of an aircraft such as a military helicopter.

PRIOR ART

A decontamination installation consists in a sealed tunnel, compartmentalised or not, enabling in said installation all operations to be conducted in the work area without bringing the decontaminants outside thereof. Such an installation can be towed and is entirely autonomous, with its own sources of electricity, water and compressed air.

The prior art discloses decontamination tunnels or pre-tunnels, in particular in the nuclear field and in the field of chemical and biological pollution. In particular, patent EP1522454 describes a mobile decontamination system for the decontamination of persons and items. This system is made of several decontamination modules, each comprising devices for the decontamination of persons and/or items. The devices of the first decontamination module are arranged on a first transportable container and the devices of the second decontamination module are arranged on a second transportable container.

Patent FR2840272 discloses a vehicle decontamination method with limited run-off, implemented on a chemical and/or bacteriological decontamination station comprising at least one treatment corridor sufficiently wide to allow the passage of said vehicles, characterised in that it comprises a prior step whereby the vehicle is placed in said corridor, a subsequent step whereby the vehicle is removed from the corridor, a step of chemical or biological decontamination of said vehicle, being performed in said corridor by means of a plurality of mobile spray booms spraying a limited quantity of a decontaminant fluid and a step whereby the run-off of said fluid in the treatment corridor is collected. This process is not at all adapted to aircraft, non-land vehicles and military materiel.

Furthermore, a technology for the disinfection of surfaces by airborne means is known, with the dispersion of a liquid biocide in the air.

In particular, patent EP2131873 describes a disinfection method by airborne means with the generation of micro-droplets at ambient temperature and biocide dispersion in a carrier gas circulating in at least one enclosure, with lowering of the temperature of the gas circulating in the enclosure, and heating of the gas circulating in the enclosure to a transport temperature of at least 35 degrees Celsius, generation of biocide micro-droplets, and injection of these micro-droplets in the carrier gas circulating in the enclosure at the transport temperature, the liquid biocide being chosen from a compound comprising hydrogen peroxide ($H_2O_2$), peracetic acid, or a mixture of hydrogen peroxide and peracetic acid, preferably comprising from 2% to 5% of peracetic acid.

The nebulisation enables to disperse a mist made of filtered water micro-droplets, without adding chemical products. This very fine mist hydrates and enhances fresh foodstuffs in the food industry, both in terms of their freshness and of their appearance, while also being environmentally-friendly.

For ultrasonic nebulisers, the transformation relies on a vibrating surface that is actuated by ultrasounds (frequency greater than twenty kilohertz).

For concentric nebulisers, the nebulisation is generated by the simultaneous introduction of the liquid and of a gas. These liquids can be water, acids, fuels, solvents, and certain paints.

The healthcare and wellbeing market features nebulisation diffusers that disperse essential oils by Venturi effect. These are called Venturi nebulisers. These vibrations, which are harmless to humans and animals, separate the molecules from one another and project into the ambient air very fine particles of essential oils by means of a nozzle. These diffusers can cover an area of up to 120 $m^2$.

The nebulisation technology is also predominantly used in cooling systems and for air-conditioning in cars; this cooling system uses an ultrasound system that is immersed in a liquid contained in the tank enabling its decontamination.

In particular, patent FR3030020 describes a device for cooling and humidifying the air in an enclosure, the device comprising a nebulisation head to expel a nebulisation liquid and a decontamination chamber supplied with nebulisation liquid, characterised in that the decontamination chamber is delimited by a wall that is at least partially in contact with the nebulisation head, so that no space exists wherein the liquid can stagnate between the contamination chamber and the nebulisation head. All these devices operate at cold temperatures and cool the ambient air.

Patent application US20050074359 discloses an integrated system for the decontamination of an aircraft, of its passengers and of the items it transports, in the event of a contamination by a pathogenic biological agent or by a chemical agent, comprising several mobile decontamination vehicles. A first system sprays a chemical decontamination solution on the outside of the aircraft. A second system performs a decontamination of the passengers using a human decontamination solution, the assembly of the systems preventing said pathogenic agents from escaping into the surrounding environment. Finally, a third vehicle uses, for the decontamination and removal of contaminants inside the aircraft, a gaseous decontaminant such as hydrogen peroxide delivered by a portable generator. This system uses separate vehicles for a full decontamination and does not insulate the aircraft for a sealed decontamination.

Technical Problem

Therefore, there is no quick, simple and efficient system enabling the decontamination by all types of decontaminants, i.e. nuclear, biological and chemical, of military aircraft and helicopters.

Indeed, the methods and systems presented above are very difficult to apply and implement in difficult conditions, in particular in conflict situations. In particular, namely because of their size, tunnels according to the prior art are not adapted for large items, in particular aircraft and helicopters.

Furthermore, cold nebulisation is not adapted in extreme situations and for chemical decontaminations. Indeed, the required lowering of the temperature is not achievable in emergency situations or in tropical countries.

Technical Solution

One of the specific purposes of the invention is therefore to overcome the abovementioned problems. The invention therefore relates, in a first embodiment, to a decontamination device, namely by nuclear, biological and/or chemical decontaminant, of materiel, in particular an aircraft such as a military helicopter.

The device comprises:
- a protective cover adaptable to the shape of the materiel, able to form a sealed decontamination tunnel around said materiel,
- at least one decontamination module, able to eliminate the contamination of the materiel placed inside the tunnel formed by the protective cover,
- an air-blowing module able to be arranged at the entrance of the tunnel formed by the protective cover in order to send air in said tunnel, and
- a filtration module able to be arranged at the exit of the tunnel formed by the protective cover to destroy the vapours of contaminated air and/or to retrieve the decontaminant product at the exit of said tunnel.

According to certain embodiments, the device further comprises one or several of the following characteristics, taken individually or according to any technically-possible combination:
- the decontamination module is a module for the injection of decontaminant product, able to be arranged under or outside the tunnel formed by the protective cover, in order to send decontaminant product on the materiel;
- the module for the injection of decontaminant product comprises an ultrasonic nebulisation system;
- the decontamination module is a suction module, able to be arranged under or outside the tunnel formed by the protective cover in order to capture the contaminated particles on the materiel;
- the air-blowing module is a hot air overpressure module able to be arranged at the entrance of the tunnel formed by the protective cover in order to send hot air in said tunnel;
- the hot air-blowing module constitutes the module, or one of the modules for the decontamination by circulation of hot air inside the tunnel formed by the protective cover enabling to remove the contaminated particles from the walls or from the inside of the materiel;
- the hot air overpressure module features a flow rate ranging substantially from 3000 to 8000 m3/h, preferably substantially equal to 5000 m3/h, in a preferred manner substantially equal to 6000 m3/h;
- the protective cover is a canvas that is able to resist toxic, nuclear, radiological, biological and chemical products;
- the filtration module comprises an activated carbon filtration system;
- the device comprises one or several frame modules able to support the protective cover;
- the device comprises a ground carpet that is able to cooperate in a sealed manner with the protective cover to constitute the floor of the tunnel formed by said protective cover;
- the device comprises one or several protective elements able to be arranged on one or several sensitive parts of the materiel that is to undergo decontamination;
- the device comprises one or several, preferably three poles intended to be secured by one of their respective ends to the protective cover to allow the placing of said protective cover around the materiel, by pulling performed from ground level.

The invention relates, according to a second embodiment, to a method for decontaminating materiel in particular by nuclear, biological and/or chemical decontaminant, to decontaminate in particular an aircraft such as a military helicopter.

The method comprises the following steps:
a. mounting a decontamination tunnel by means of a protective cover that is adaptable to the shape of the materiel, arranged around said materiel,
b. one or several decontaminations of the materiel by means of one or several decontamination modules,
c. introduction of air inside the tunnel formed by the protective cover by means of an air-blowing module arranged at the entrance of said tunnel,
d. filtration of the decontaminant product by a filtration module arranged at the exit of the tunnel formed by the protective cover, to destroy the contaminated vapours and/or to retrieve the decontaminant product at the exit of said tunnel.

According to certain embodiments, the method further comprises one or several of the following characteristics, taken individually or according to any technically-possible combination:
- the decontamination module is a module for the injection of a decontaminant product, the decontamination step is a decontamination by means of the injection of a decontaminant product by the injection module arranged under or outside the tunnel formed by the protective cover in order to send the decontaminant product on the materiel;
- the decontamination of the materiel by injection of the decontaminant product comprises the ultrasonic nebulisation of said decontaminant product;
- the decontamination module is a suction module, and the decontamination step is a suction step performed by the suction module arranged under or outside the tunnel formed by the protective cover to capture the contaminated particles present on the materiel;
- the step of sending air in the tunnel formed by the protective cover is a step of sending pressurised hot air performed by a hot air overpressure module arranged at the entrance of the tunnel;
- the hot air overpressure module constitutes the or one of the decontamination modules, and the step of sending pressurised hot air in the tunnel formed by the protective cover constitutes the step or one of the steps of decontamination by hot air circulation inside said tunnel, enabling to remove contaminated particles from the walls of from the inside of the materiel;
- the step of sending pressurised hot air in the tunnel formed by the protective cover comprises the introduction of hot air at a flow rate substantially ranging from 3000 to 8000 m3/h, preferably substantially equal to 5000 m3/h, in a preferred manner substantially equal to 6000 m3/h;
- the filtration step of the decontaminant product uses a filtration module comprising an activated carbon filtration system;
- the step of mounting the protective tunnel comprises the use of one or several frame modules to support the protective cover;
- the step of mounting the protective tunnel comprises the insertion of the materiel under the protective cover supported by the frame module(s), and the subsequent placing of the protective cover to form a sealed shell around the materiel;

the step of mounting the protective tunnel comprises the placing of a ground carpet that cooperates in a sealed manner with the protective cover to constitute the floor of said tunnel;

the method comprises a step whereby one or several protective elements are placed on one or several sensitive parts of the materiel to be decontaminated;

the method comprises the use of several poles, preferably three poles, secured by one of their respective ends to the protective cover to enable the placing of said protective cover around the materiel 1 by pulling performed at ground level.

FIGURES

Figure 2:
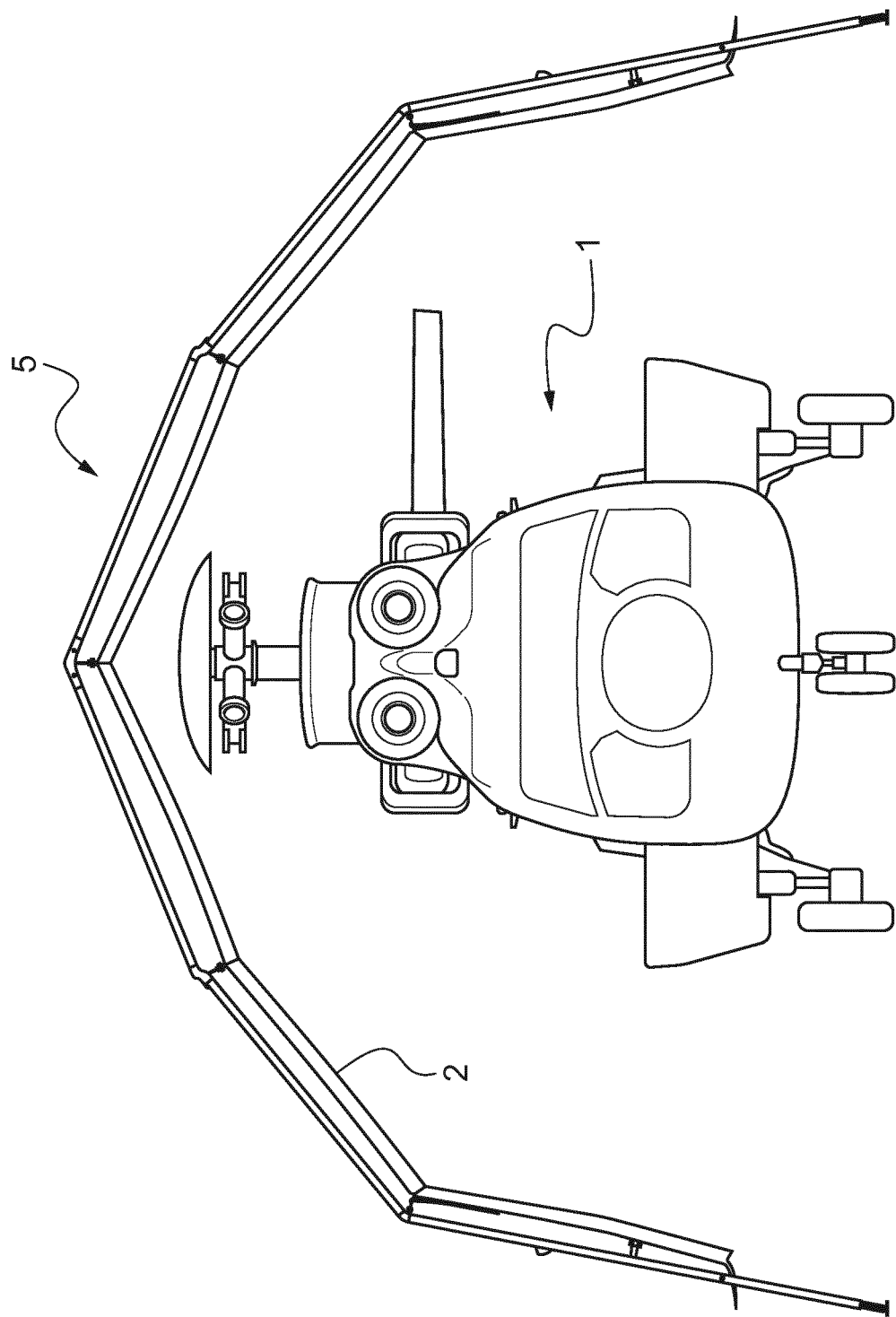

The characteristics and advantages of the invention will be revealed upon reading the following description, provided exclusively by way of example and not limited thereto, with reference to the following appended figures:

FIG. 1: example of a device according to the invention, implemented around a military helicopter;

FIG. 2: example of a device according to the invention being placed around a military helicopter.

EMBODIMENTS

The decontamination device according to the invention, in particular intended for military materiel, namely aircraft such as helicopters, relates to the treatment of contamination immediately after a mission in a non-contaminated area. The operating principle consists in accelerating the evaporation of the toxic agent(s) present on the aircraft by means of a hot air flow delivered at a high flow rate and an atomiser able to deliver a humidifying and decontaminant solution favouring the evaporation of "permanent" toxic agents.

As shown in FIG. 1, a protective cover 2 is placed around the materiel 1 to be decontaminated, in this example a military helicopter 1. This protective cover 2 enables to channel the air flow around the materiel 1 to be decontaminated. By channelling the air flow around the materiel 1, the protective cover 2 also enables to control the maximum temperature that the materiel 1 is able to withstand, by means of a temperature probe (not shown in FIG. 1) adequately arranged under the protective cover 2, to control the flow rate of the hot air and to retrieve the toxic vapours, which, depending on their concentration levels, can be destroyed for example by chlorination or any other type of decontamination, or released into the atmosphere, based on the toxic agent content measured at the end of the tunnel formed by the protective cover 2.

The tunnel and in particular the dimensions of the protective cover 2 are designed to cover different types of materiel 1, in particular different types of helicopters 1 in all of their different configurations.

Preferably, the tunnel is designed to cover any single-engine materiel provided with folding blades with a length of less than 25 metres and a height of less than 10 metres.

The decontamination device comprises, in a preferred and non-limiting manner, at least one and preferably two frame modules 5 used to support the protective cover 2 during the installation of said protective cover 2, as shown in FIG. 2.

The protective cover 2 is therefore adaptable to different aircraft 1.

A ground carpet 9 is also provided, the size of said carpet being adaptable to different aircraft 1.

An air-blowing module 3, which can be a hot air overpressure module 3, is arranged at the entrance of the tunnel formed by the protective cover 2 to send air (possibly hot pressurised air) in said tunnel.

Said module 3 comprises an air gun 6 associated with a pump 7 powered by a generator 8.

A decontamination module, which can be a mist injection module, or can comprise an ultrasonic nebulisation system, or can also be a suction module, is also provided. It is arranged inside the tunnel formed by the protective cover 2, or outside the tunnel, in order to send a decontaminant product on the helicopter 1 (injection module) or to remove the contaminated particles present on the helicopter 1 (suction module).

Alternately, the decontamination is achieved simply by the hot air sent by the hot air overpressure module 3. This decontamination is specifically achieved by the circulation of hot air sent by the hot air overpressure module 3 inside the tunnel formed by the protective cover 2, which enables to remove the contaminated particles from the walls or from the inside of the materiel 1.

The device according to the invention can therefore comprise the hot air overpressure module 3 alone. In this case, this hot air overpressure module 3 fulfils the decontamination function such as explained hereinabove, adapted to certain types of decontamination.

The device according to the invention can also comprise both the air-blowing module 3, which is not necessarily a hot air overpressure module 3, and a separate decontamination module operating by injection of a decontaminant product. In this case, the decontamination function is achieved by the separate decontamination module operating by injection of a decontaminant product.

Finally, the device according to the invention can comprise both the air-blowing module 3 of the hot air overpressure module 3 type, and a separate decontamination module operating by injection of a decontaminant product. In this case, the decontamination function can be achieved either by the separate decontamination module operating by injection of a decontaminant product, or by the hot air overpressure module 3, depending on the required type of decontamination.

It is also possible to provide one or several protective elements to be arranged on the sensitive parts of the aircraft 1, in order to protect said sensitive parts.

As an alternative to the use of the abovementioned frame module 5, one or several poles are provided, preferably three poles, and are used to position the protective cover 2 around the aircraft 1, manually and directly from ground level. By adequately securing the respective ends of these poles to the protective cover 2 laid out on the ground, it is possible to manually pull it from ground level, using the poles, progressively around the aircraft 1, until it entirely surrounds the aircraft 1.

The frame module(s) 5 is/are made of aluminium or of a thermoplastic material loaded at 30 to 50% with fibreglass or carbon or a mixture thereof, recycled on non-recycled. The profiles are for example made of a 6060 T5 alloy (AFNOR standard EN 573) or of a lacquer varnish RAL 6014 (epoxy powder). The mechanisms are made entirely or predominantly by bulk machining in AU 2017. A surface treatment can also be provided for resistance in saline environments, achieved by anodising (mat black). The axes and the screws are preferably made of stainless steel.

The generator 8 is provided with an interface for the attachment onto the hot air gun 6 and pump 7 assembly. Its main characteristics are, preferably, those listed in table 1.

TABLE 1

| | |
|---|---|
| Frequency (Hz) | 50 |
| Voltage (v) | 230 |
| Continuous power | 5k va |
| Max power | 6k va |
| Continuous current | 12 v-8.3 A |
| Engine | AT186FE |
| Type | Single cylinder 4 stroke |
| Engine displacement | 406 cm3 |
| Start | Manual and electric + preheating |
| Engine speed (rev/min) | 3'000 |
| Max engine power | 10 hp |
| Stroke × bore | 86 mm × 70 mm |
| Oil tank | 1.65 L |
| Sound level db at 7 m | 80 db |

The hot air gun 6 can, for example, be made of a standard system, modified to improve the blowing flow rate despite the continuous pressure at the output of the gun. Its characteristics are preferably those listed in table 2.

TABLE 2

| | |
|---|---|
| Burner (kW) | 80.6 |
| Yield | 91% |
| Air flow rate (m3/h) | 6000 |
| Fuel consumption (litres/h) | 6.8 |
| Electric consumption 230 V single | 4 A |
| Sound level 1 m | 74.3 dB(A) |
| Chimney diameter | 180 mm |
| Air output diameter | 400 and 2 × 300 |

The hot air gun 6 can be part of an assembly comprising an autonomous diesel system on a chassis comprising the ventilation and heating on one hand, and the generator 8 on the other hand. Preferably the generator 8 is easy to disconnect and the assembly is therefore easy to transport as two units.

The protective cover 2 is made of a canvas that is able to withstand CBRN (chemical, biological, radiological, nuclear) toxic agents. It is preferably divided into as many parts, which makes it adjustable and adaptable, in order to cover the different dimensions of the materiel 1 to be decontaminated. Its characteristics are preferably those listed in table 3.

TABLE 3

| | | |
|---|---|---|
| Weight | gr/m² | 265 +/− 15% |
| Thickness | microns | 225 +/− 15% |
| Stretch resistance (ASTM D 882-97) | N/15 longitudinal | 105 +/− 15% |
| | transversal | 99 +/− 15% |
| Elongation | % longitudinal | >300 |
| | transversal | >350 |
| Tear resistance (continuous effort) | N/15 longitudinal | 30 +/− 15% |
| | transversal | 30 +/− 15% |
| Resistance to mustard gas | More than 24 hours | |
| Welding | High frequency | |
| Visual aspect | Translucent, without particles, bubbles, folds or cracks Different colours | |
| Other characteristics | Very low noise level >reduced thickness | |

The ground carpet 9 is divided into as many parts, which makes it adjustable and adaptable, in order to adapt to the different dimensions of the materiel 1 to be decontaminated. It can be installed on all types of ground. It is made of a canvas, the characteristics of which are preferably those listed in table 4.

TABLE 4

| | | |
|---|---|---|
| Textile | 100% PES 1100 dtex | |
| Weight | 700 g/m2 abuv | NF G 37102 DIN 53352 ISO 2286 |
| Lacquer varnish | 0/0 | |
| Break resistance Chain | 2000 N/5 cm | EN ISO 1421 |
| weft | 2000 N/5 cm | DIN 53354 ISO 1421 |
| Tear resistance Chain | 170 N | DIN 53363 |
| weft | 250 N | NF G 37130 |
| Adherence | 100 N/5 cm | EN ISO 2411 DIN 53530 ISO 2412 |
| Temperature resistance | −30° C./+70° C. | DIN EN 1876-2 1988 |
| Light resistance (except in white and in (semi-) transparent) | 6-8 | NFG 07-012-2 |
| Flammability | M2 | NFP 92 507 |
| Application | Anti-slip carpet | |

An example showing the mounting of the device is provided below, in the case of the decontamination of a helicopter.

The first step consists in mounting the decontamination tunnel. The deployment and positioning of the bearing structure comprising the frame module(s) 5 is performed horizontally. The canvas forming the protective cover 2 is then deployed and attached under the framework formed by the different frame modules 5. Once the framework 5 and the protection cover 2 are installed, the hot air gun 6 of the hot air overpressure module 3 is installed at the rear, or at the entrance, of the protective cover 2.

In parallel, it is possible to position the protective elements on the sensitive parts of the helicopter 1. Once the protective cover 2 is installed on the framework 5 and the protective elements are positioned on the helicopter 1, the placing of the protective cover 2 around the helicopter 1 can begin. The aircraft 1 provided with the protective elements is placed on the ground carpet 9, and the aircraft is backed 1 under the framework 5 plus protective cover 2 assembly, until it comes into contact with the end of the protective cover 2. The protective cover 2 is then deployed on and around the aircraft 1.

Once the protective cover is in place 2, the hot air overpressure module 3 can be started.

The starting of the hot air overpressure module 3 can be performed prior to the starting of the decontaminant product injection module, such as an atomiser, or simultaneously thereto.

After the starting of the decontaminant product injection module, a control device can be installed at the exit of the tunnel, to measure the toxic agent content at output.

Once the decontamination procedure is complete, the protective cover 2 can be removed from the aircraft 1. If the decontamination is complete (aircraft 1 and protective cover 2 of the tunnel), the canvas forming the protective cover 2 is laid out on the ground and rolled so that it can be stowed away in its bag. Then the framework 5 can be folded and disassembled.

Only the lower part of the protective cover 2 is at risk of being contaminated by transfer, during contact with the fuselage of the aircraft 1. This contamination must be eliminated by evaporation during the treatment of the aircraft 1. However, if it isn't, if there is any doubt, or before the disassembly and repacking for storage, the tunnel is sealed after removal of the aircraft 1 and undergoes misting by the decontaminant product injection module, followed by an evaporation step.

The ground carpet 9 undergoes specific inspection on a soggy ground, and possibly a specific decontamination process. The destruction of contaminated vapours at the exit of the tunnel can be achieved by connection of the decontaminant product injection module at the exit of the tunnel.

In a preferred manner, the decontaminant product is a decontamination solution comprising at least 15% of sodium hypochlorite.

The choice of humidifying and decontamination solutions can be made from the following list, provided by way of example: product "GD-6" by the company OWR; product "TECcare Ultra"; products "BX 24", "BX 30", "BX 40", "BX 60/2" and "BX 65" by the company Cristanini; products "RDS 2000", "GDS 2000" and "RM 21" by the company Karcher.

In order to perform a biological decontamination, an adequate decontamination solution is used with a misting system placed inside the sealed tunnel.

The purpose is to create and maintain an atmosphere filled with the decontamination product, to reduce the contact time with the contaminant agent.

At the end of the decontamination process, the user can collect samples on the different parts of the helicopter 1 and perform quick tests or send the samples to a laboratory where said tests can be performed. A quick on-site test takes only a few minutes, and does not compromise an on-going tactical operation by the aircraft 1. Such tests enable to ensure that the decontamination has been properly performed.

The method according to the invention requires only one operator for the installation of the injection module inside the tunnel. Then, the device according to the invention functions without the intervention of an operator inside the tunnel. The device according to the invention is easy to use.

The device according to the invention enables to achieve a decontamination volume of up to 600 m3. The treatment times range from 36 minutes for a volume of approximately 150 m3 to 68 minutes for a volume of approximately 600 m3.

Other advantages of the device and the method according to the invention are:
- total environmental decontamination targeting the transmission routes of the infection;
- possibility of deployment to control the contamination sources, or preventive use to reduce the risk of transmission of highly-infectious pathogenic agents;
- adapted to use in different healthcare systems, with a reduced training period;
- sturdy design to satisfy the requirements in acute and primary healthcare environments, enabling an efficient and quick decontamination;
- use of a fast-acting and large-spectrum biocide technology, with key advantages in terms of safety and efficacy, with respect to other technologies relying on vaporisation and spraying.

For chemical decontamination, an injection module is used and requires only a few minutes to fill the atmosphere with decontaminant. It is necessary to ensure that the decontaminant product reaches all of the parts of the aircraft 1, and remains in contact with the contaminant for at least 15 minutes. In this application, it is preferable to maintain the tunnel sealed.

After 15 minutes, the tunnel can be opened and control tests can be conducted, in order to ensure that there is no chemical agent remaining inside the tunnel or inside the aircraft. This procedure can be implemented with a chemical detector, precautions being taken to ensure that all the critical parts of the aircraft 1 have been reached.

For sensitive surfaces, such as the inside of the aircraft 1, a decontamination agent in a non-aqueous solution can be used and applied in thin layers.

The outside of the aircraft 1 can be decontaminated using a low-pressure injection module to protect the sensitive parts of the aircraft 1, such as the vision devices and the thermal imaging systems.

Regarding radiological contamination, which is difficult to control, the purpose is to remove the radioactive dust from the surface of the aircraft 1. For this purpose, a vacuum cleaner can be used to absorb the powder. Such a vacuum cleaner can be used on very sensitive surfaces, such as the electric dashboard of the aircraft 1. This procedure can be implemented simultaneously to a control procedure. Said control can also be implemented prior to the use of the vacuum cleaner, in order to identify the sources of radiation and to concentrate on the corresponding parts of the aircraft 1.

After all the decontaminations (biological, chemical and radiological), the vacuum cleaner can be used to clean the tunnel. Such an extraction device must enable to retrieve all the liquids and solids from different CBRN sources.

All persons involved in the use of the device according to the invention, and in the implementation of the method according to the invention, must wear protective clothing, gloves, overshoes, etc. . . .

The present description is provided by way of example of the invention and is not limited thereto. In particular, the invention is not limited to the decontamination of a helicopter, or of any other type of aircraft, but extends to the decontamination of any type of vehicle and materiel, namely military materiel, such as tanks, trucks, missiles transported in a vehicle or military materiel.

The invention claimed is:

1. A device for the decontamination of materiel, comprising:
- a protective cover adaptable to the shape of the materiel, able to form a sealed decontamination tunnel around said materiel, the protective cover having an inner surface forming an interior of the tunnel to house the materiel;
- a ground carpet able to cooperate in a sealed manner with the protective cover to constitute a floor of the tunnel formed by said protective cover, the ground carpet made of flexible material;
- a decontamination module, able to eliminate the contamination of the materiel placed inside the tunnel formed by the protective cover;
- an air-blowing module sealed to the entrance of the tunnel formed by the protective cover in order to send air into the interior of the tunnel; and
- a filtration module sealed to the exit of the interior of the tunnel formed by the protective cover to destroy the vapours of contaminated air and/or to retrieve the decontaminant product at the exit of said tunnel, wherein air enters and leaves the interior of the decontamination tunnel only through the entrance, the exit and the decontamination module.

2. The device according to claim 1, wherein the decontamination module is a decontaminant product injection module able to be arranged under or outside the tunnel formed by the protective cover to send the decontaminant product on the materiel.

3. The device according to claim 1, wherein the decontamination module is a suction module able to be arranged under or outside the tunnel formed by the protective cover to remove the contaminated particles from the materiel.

4. The device according to claim 1, wherein the air-blowing module is a hot air overpressure module.

5. The device according to claim 1, further comprising a rigid frame having sides and a top to support the protective cover.

6. A method for decontaminating materiel comprising:
providing the device according to claim 1;
mounting the decontamination tunnel by means of the protective cover that is adaptable to the shape of the materiel, arranged around said materiel;
sealing the protective cover to the ground carpet able to constitute the floor of the tunnel formed by said protective cover, the ground carpet made of flexible material;
performing one or several decontaminations of the materiel by means of a of the decontamination module;
introducing air inside the tunnel formed by the protective cover by means of the air-blowing module arranged at the entrance of said tunnel; and
filtrating the decontaminant product by the filtration module arranged at the exit of the tunnel formed by the protective cover, to destroy the contaminated vapours and/or to retrieve the decontaminant product at the exit of said tunnel,
wherein air enters and leaves the decontamination tunnel only through the air-blowing module, the filtration module and the decontamination module.

7. The method according to claim 6, wherein the decontamination module is a decontaminant product injection module, and
wherein the decontamination step is a step of decontamination by injection of a decontaminant product by means of the injection module arranged under or outside the tunnel formed by the protective cover to send the decontaminant product on the materiel.

8. The method according to claim 6, wherein the decontamination module is a suction module, and
wherein the decontamination step is a step of decontamination by suction performed by the suction module arranged under or outside the tunnel formed by the protective cover to remove the contaminated particles present on the materiel.

9. The method according to claim 6, wherein the step of sending air in the tunnel formed by the protective cover is a step whereby pressurised hot air is sent by a hot air overpressure module arranged at the entrance of said tunnel.

10. The method according to claim 6, wherein the step of mounting the protective tunnel comprises the use of one or several frame modules to support the protective cover.

11. The method according to claim 10, wherein the step of mounting the protective tunnel comprises the introduction of the materiel under the protective cover supported by the frame module(s), followed by the installation of the protective cover to form a sealed shell around the materiel.

12. The device according to claim 2, wherein the air-blowing module is a hot air overpressure module able to be arranged at the entrance of the tunnel formed by the protective cover to send hot air in said tunnel.

13. The device according to claim 3, wherein the air-blowing module is a hot air overpressure module able to be arranged at the entrance of the tunnel formed by the protective cover to send hot air in said tunnel.

14. The device according to claim 2, further comprising a rigid frame having sides and a top to support the protective cover.

15. The device according to claim 3, further comprising a rigid frame having sides and a top to support the protective cover.

16. The device according to claim 4, further comprising a rigid frame having sides and a top to support the protective cover.

17. The device according to claim 1, wherein the flexible material is canvas.

18. The method according to claim 6, wherein the flexible material is canvas.

* * * * *